Figure 1:
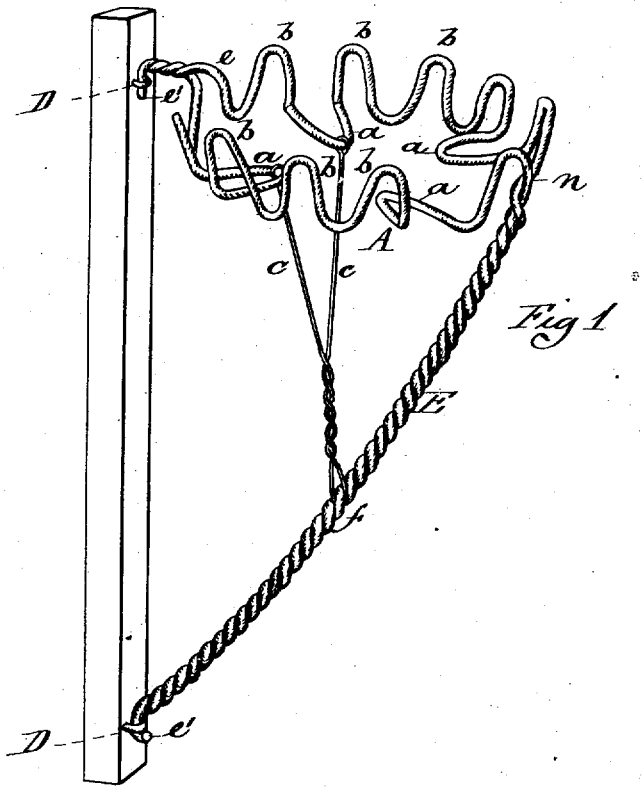

A. B. DENISON.
Bracket Stand.

No. 9,517. Reissued Dec. 28, 1880.

Witnesses
Wm H Chapin
J. D. Garfield

Inventor
Amos B Denison
By Henry A Chapin
Atty.

N. PETERS, PHOTO-LITHOGRAPHER, WASHINGTON, D. C.

UNITED STATES PATENT OFFICE.

AMOS B. DENISON, OF KEENE, NEW HAMPSHIRE.

BRACKET-STAND.

SPECIFICATION forming part of Reissued Letters Patent No. 9,517, dated December 28, 1880.

Original No. 165,549, dated July 13, 1875; Reissue No. 8,669, dated April 15, 1879. Application for reissue filed September 3, 1880.

*To all whom it may concern:*

Be it known that I, AMOS B. DENISON, a citizen of the United States, residing at Keene, in the county of Cheshire and State of New Hampshire, have invented a new and useful Improved Bracket-Stand, of which the following is a specification.

My invention relates to the construction of light ornamental metallic brackets and stands suitable for use in houses for supporting flower-pots and other objects of ornament; and the object thereof is to provide a bracket-stand for the above-named purpose, in which the bracket-supports and the bracket-stand are constructed from continuous wires, forming both supports and stand, so that the wires forming the latter are integral with those from which the former are constructed, and to provide for such bracket-stands a light and ornamental wire-flange border.

I attain the above-named objects by the construction illustrated in the accompanying drawing, which is a perspective view of my invention.

In the drawing, A is the platform portion of the bracket-stand.

E is the inclined support to the platform, having its lower end bent hook-shaped, as shown, to engage pivotally in the staple D. A horizontal support, *e*, to the platform, also properly bent to have its end engage pivotally in the upper staple, D, extends rearwardly from the platform, as shown, and by said supports the bracket-stand is secured against any wall or similar place provided with proper staples for hooking the supports into. The said platform and supports constitute the whole or main portion of the bracket, and may be made with two single pieces of wire, as follows: The wire is bent to form the upper hook, *e'*, on support *e*, and the two wires united are twisted or bent together to the desired point to form an arm or support, *e*, and the wires are then bent to form the portions *a* and *b*, and so as, together, to form the platform A, consisting of the flanged border portions *b* and the portions *a*, converging from the parts *b* toward the center of the platform.

The platform having been formed, as above described, the wires are joined at *n*, and are twisted or bent together from that point to the lower end of the inclined support E, and a hook or catch, *e'*, is formed at the extreme lower end, as above set forth and shown.

The converging parts *a* of the platform may be made more secure against deflection caused by undue weight placed thereon by placing one or more braces, *c*, between the inclined support E and said parts *a*, and when two of said braces are used they may be formed of a single piece of wire doubled, and, passing around one of the wires of the support E at *f*, may be twisted for a short distance above, then separated and be attached to the parts *a* of the platform.

The wire may be of any desirable ornamental form, and may be bent into a great variety of ornamental shapes, and with the hooks or catches *e'*, formed at the two points of support, above and below, the bracket-stand may be readily attached by staples, as shown, at any desirable point.

When secured upon a wall, as above described, the stands are perfectly free to swing upon the pivotal connections, and they serve to support any light ornamental objects or flower-pots, as may be desired.

What I claim as my invention is—

1. A bent-metal bracket-stand having an inclined support, E, provided with a hook, *e'*, and a horizontal support, *e*, provided with a hook, *e'*, and a platform formed from wires integral with those composing said supports, substantially as set forth.

2. A bent-metal bracket-stand having an inclined support, E, provided with a hook, *e'*, and a horizontal support, *e*, provided with a hook, *e'*, and a platform formed from wires converging from the border toward the center, and provided with a border-flange of wire, substantially as set forth.

3. A bent-metal bracket-stand consisting of the platform A, the supports E and *e*, both of which are provided with a hook, *e'*, and the brace *c*, substantially as set forth.

AMOS B. DENISON.

Witnesses:
J. R. BEAL,
O. G. DORT.